Sept. 22, 1959 P. H. ODESSEY 2,904,804
DEVICE FOR CLEANING POTS, PANS AND THE LIKE
Filed March 31, 1955
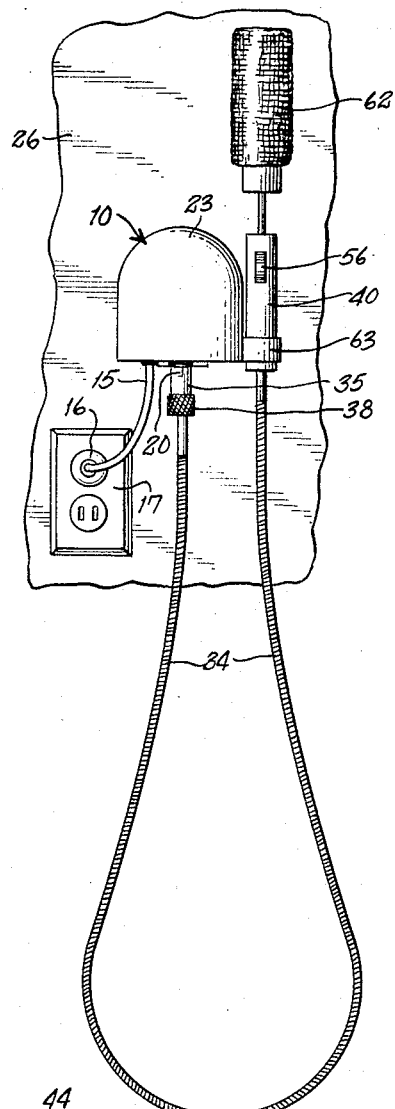
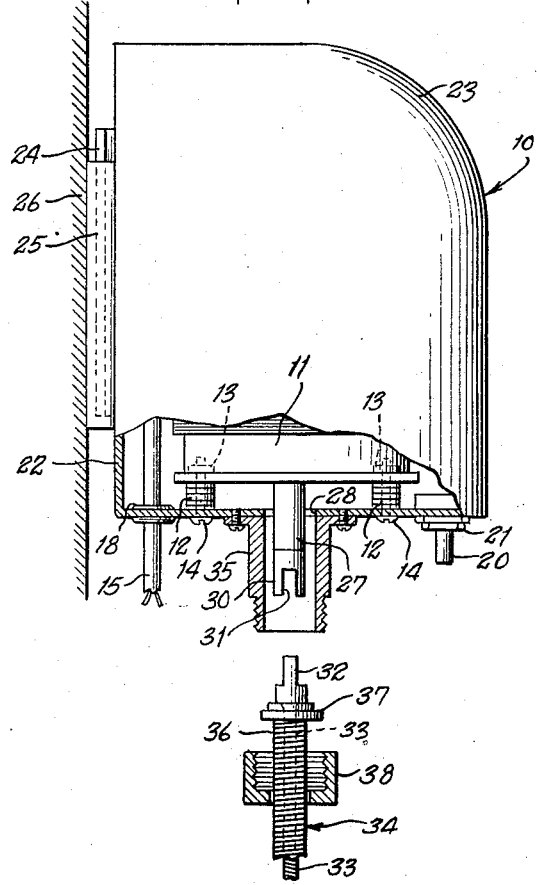
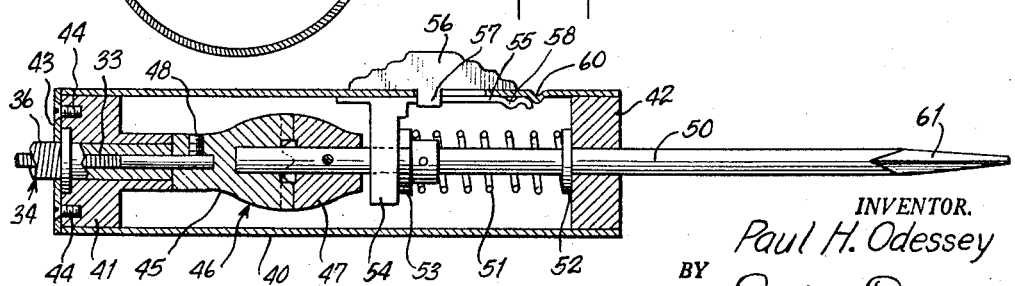
INVENTOR.
Paul H. Odessey
BY Darby + Darby
ATTORNEYS United States Patent Office 2,904,804
Patented Sept. 22, 1959

2,904,804

DEVICE FOR CLEANING POTS, PANS AND THE LIKE

Paul H. Odessey, Flushing, N.Y., assignor to Polarad Electronics Corporation, Brooklyn, N.Y., a corporation of New York Application March 31, 1955, Serial No. 498,215

5 Claims. (Cl. 15—97)

The present invention relates to a device for cleaning pots, pans, mess kits, etc.

More particularly still the invention relates to a power driven device particularly adapted to remove material resulting from cooking from the interior of cooking utensils such as pots, pans, dishes, trays, etc.

Still more particularly the invention relates to such a pot scrubbing device which is electrically driven and which is mechanically controlled in order to start and stop the scrubbing unit at will, while at the same time presenting no electrical shock hazard to the operator. In general the device of the instant invention comprises an electrical motor having a flexible output shaft at the end of which is a mechanical dog clutch coupled at will to the flexible shaft and having an output shaft which carries a scrubbing pad of steel wool or similar material which is thus rotated against the material to be cleaned. The motor is encased in a housing and the electrical circuits thereof are completely insulated from the control clutch and the scrubbing unit proper, in order to assure that even under the conditions which such a pot scrubber is utilized there will be no shock hazard.

It is an object of the invention to provide a power driven device for use in cleaning cooking utensils such, for example, as pots, pans, pie plates, and cake tins.

It is another object of the invention to provide such a cleaning device which is electrically driven and in which the scrubbing unit proper may be connected or disconnected from the drive unit mechanically.

It is a further object of the invention to provide such a cleaning device wherein the driving motor and the control and scrubbing unit are connected by a flexible shaft, the shaft being insulated from the driving motor and its electrical circuits to assure that even under the wet conditions normal to the use of such a device there will be no electrical shock hazard.

It is a still further object of the invention to provide an electrically driven device for cleaning cooking utensils which utilizes a cylindrical pad of metal wool to perform the cleaning operation, the device being so arranged that the cleaning pad may be readily replaced.

It is a still further object of the invention to provide such a cleaning device which is simple in construction, readily used and economically manufactured and serviced.

Other objects and features of the invention will be apparent when the following description is considered in connection with the annexed drawings, in which, Figure 1 is a front elevational view showing the device of the present invention mounted on a wall or the like, the scrubbing unit being in a clip on the motor unit where it is kept between periods of use;

Figure 2 is a side elevational view with the motor cover partly broken away and with the flexible shaft shown disconnected from the motor unit. This view illustrates particularly the mode of mounting the motor housing to the wall, the mode of mounting the motor within its housing, and the mode of mechanically connecting the flexible shaft to the motor shaft while electrically insulating the two; and Figure 3 is a cross-sectional view of the control unit showing also the output shaft to which a pad of metal wool is fixed.

Referring now to the drawings, there is shown at 10 a motor housing within which is a small electric motor 11. The motor 11 is mounted within the housing 10 on the insulating bushings 12, the motor thus being insulated from the housing since the nuts 13 on the screws 14 are also of insulating material such, for example, as nylon.

The motor is supplied with current through a cable 15 which terminates in the customary plug 16 shown in Figure 1 as inserted into a wall receptacle 17. The cable 15 enters the housing 10 through an insulating bushing 18, one wire of the cable then being connected to a switch 20 which is also mounted in an insulating bushing in the housing 10 and held in place by means of an insulating nylon washer and nut 21.

The motor is conventional and is provided with a fan at its upper end which circulates air within the housing and thus cools the motor. The housing 10 comprises the L-shaped bracket portion 22 together with the cover 23 which has the general shape of a quarter sphere. Mounted on or formed integrally with the vertical portion of the bracket 22 is a tapered mounting plate 24 which fits within a tapered mounting bracket 25 which is affixed to a surface such as that indicated at 26 in any suitable manner such for example as by screws. The bracket 22 is thus held in position against the surface 26 it being understood that the motor bracket 22 is inserted from the top, the plate 24 and bracket 25 being wider at the top than at the bottom so that the motor is readily removable therefrom. The type of mounting bracket disclosed is commonly used in mounting various utensils on the wall, for example, wall mounted can openers are frequently provided with brackets of the type here disclosed.

The shaft 27 of motor 11 extends through a clearance hole 28 in the horizontal portion of the bracket 22. This shaft 27 terminates in a portion 30 formed of insulating material and bonded to the shaft 27. The nylon or other insulating shaft extension 30 is provided with a slot 31 therein which slot is engaged by the member 32 fixed to the core 33 of a flexible shaft generally designated 34.

Mounted on the horizontal portion of bracket 22 and concentric with the shaft 27—30 is a threaded flange 35. Fixed to the casing 36 of the flexible cable 34 is a flange 37 and slidably mounted upon the core 36 is a coupling nut 38 threaded to mate with the threads on the flange 35. By means of this arrangement the blade-like extension of terminal member 32 of the flexible cable may be inserted in the mating slot in shaft portion 30 and held in this position by screwing the nut 38 onto the threaded flange 35 thus holding the flange 37 against the flange end and assuring that the plate 32 will remain in the slot 31. Additionally, the construction described presses the flange 37 against the end of flange 35 and prevents rotation of the casing member 36 of the flexible cable 34.

At its opposite end the flexible cable 34 is connected to a control unit shown best in Figure 3, this control unit comprising a cylindrical casing 40, closed at the ends by means of the members 41 and 42.

The flexible cable 34 is inserted in the bushing 41, the casing 36 of the cable being provided with a disk fixed thereto adjacent its end which disk lies in a recess in the left hand end of bushing 41. A plate 43 having a central circular opening of substantially the size of the casing 36 is fixed to the bushing 41 by means of the screws 44 thus holding the cable in position in the bushing to permit rotation of the bushing thereabout.

The core 33 of the flexible cable 34 extends beyond the right hand end of bushing 41 and into a blind bore in the left hand end of the driving member 45 of a clutch 46. Member 45 of the clutch is fixed to the core 33 by means of a set screw 48 and thus the driving element of the jaw clutch rotates with the core 33.

Mounted for rotation in the bushing 42 and in a blind bore in the driving clutch member 45 is a shaft 50 which at its left hand end has pinned thereto the driven member 47 of the jaw clutch 46. Shaft 50 is mounted for limited reciprocating movement being normally urged to the left as seen in Figure 3 by means of a spring 51 which extends between a washer 52 adjacent the bushing 42 and a collar 53 fixed to the shaft 50. This normal leftward position of shaft 50 brings the jaws of clutch members 46 and 47 into engagement so that the shaft 50 is driven by the flexible cable core 33.

Mounted for reciprocating movement with respect to the control unit casing 40 is a fork member 54, the tines of which lie on either side of the shaft 50, bearing against the collar 53. Fixed to a horizontal extension 55 of the fork 54 is a button 56, the connecting member 57 extending through a slot in the casing 40, the length of the slot serving to limit the movement of the fork 54 and the button 56. The horizontal extension 55 of the fork 54 is formed of resilient material and is provided with a depression or dimple 58. Similarly, a dimple 60 is formed in the casing 40 so that when the button 56 is moved to the right the dimples will engage each other and retain the fork together with the shaft and clutch member 47 in their right hand positions in which the driven element 47 of the clutch is disengaged from the driving element. Shaft 50 is provided at its outer end with a squared and tapered end 61 on which a generally cylindrical pad of metal wool is mounted as indicated at 62 in Figure 1. The metal wool pad 62 is provided with a wooden core which has an interior surface formed to mate with the squared and tapered end 61 of the shaft 50. The exact construction of the metal pad is not here described since it forms the subject matter of an application filed concurrently herewith in the name of William Rympalski and assigned to the same assignee.

Mounted on the housing 23 or other suitable portion of the motor unit 10 is a clip 63 which is adapted to hold the control unit 40 when the device is not in use, the clip 40 being a usual spring clip.

As will be seen, the customary manner of mounting the device is as illustrated in Figure 1 wherein the motor unit is mounted on the wall. However, if desirable only the bracket 25 may be permanently positioned on the wall and the motor unit together with the remainder of the device may be stored away in a cabinet or drawer when not in use. Assuming that the motor unit has been mounted on the wall in the manner shown in Figure 1 and that the unit is sufficiently near the ordinary location in which utensils are cleaned, such for example as the kitchen sink, so that the flexible cable will readily reach to that location, the mode of procedure in scrubbing a pot or pan will now be given in some detail. The switch 20 is first operated to start the motor and the control unit 40 is then removed from the clip 63 by grasping the cylindrical housing in one hand. The scrubbing pad 62 is then placed against the surface to be scrubbed or cleaned. The button 56 is then moved rearwardly by means of the thumb which engages the clutch 46 and causes the cleaning pad 62 to rotate. It is usually desirable to rinse the utensil being cleaned before scrubbing with the device and usually also desirable to utilize soap powder or detergent which may be sprinkled into the utensil in the area to be cleaned. Also, the pot should be wetted before the rotation of the pad is initiated by operation of the control button 56.

When the cleansing of the utensil has been completed the rotation of the pad is discontinued by operation of the control button in the forward direction; the cleaning pad 62 is rinsed and the control unit 40 returned to the spring clip.

As has been indicated, the device would normally be allowed to remain in position on the wall. However, if desired, the flexible cable 34 may be detached from the motor unit by uncoupling the nut 38 from the flange 35 and the cable and cable control unit and cleaning pad stored in another location or, if desired, the entire unit may be removed from the bracket 25 and stored.

As will be seen the device is simple and rugged in design with a minimum number of moving parts and therefore with maintenance reduced to a minimum and assurance of long life. Additionally, the device is efficient in operation and quickly removes the most stubborn spots, even food which has been badly burned, from cooking utensils, grills, grids and the like.

While I have described a preferred embodiment of the invention, it will be understood that I wish to be limited not by the foregoing description, but solely by the claims granted to me.

What is claimed is:

1. In a motor powered scrubbing machine having a motor with an extended shaft and a flexible cable with a core attached to said shaft and a casing attached to the housing of said motor, the improvement comprising clutch means connected to said cable at the end opposite said motor and means driven by said clutch for rotating a scrubbing pad; said clutch means comprising a tubular clutch housing having closed ends, means retaining said cable casing end in one end of said clutch housing, said retaining means permitting rotation of said clutch housing about said cable casing, a driving clutch jaw rotatably mounted in said clutch housing, said jaw being fixed to said cable core for rotation therewith, a clutch shaft having a collar thereon rotatably and slidably supported in said clutch housing and extending through the end thereof opposite said cable connection, a driven clutch jaw mounted on said clutch shaft, means on said shaft external to said clutch housing for retaining a scrubbing pad, means normally urging said driven clutch jaw into engagement with said driving clutch jaw, and means manually urging said driven clutch jaw out of engagement with said driving clutch jaw, said last mentioned means comprising a collar on said clutch shaft, a fork extending perpendicular to said shaft and bearing against said collar, said fork having a resilient extension lying parallel to said clutch housing, a slot in said housing and an operating button mounted on said extension outside said housing and adapted to be manually operated to disengage said driven clutch jaw from said driving clutch jaw, said fork extension having a depression therein and said clutch housing having a mating depression, said depressions engaging together to hold said fork in the position in which said driven clutch jaw is out of engagement with said driving clutch jaw.

2. In a motor powered scrubbing machine having a motor with an extended shaft and a flexible cable with a core attached to said shaft and a casing attached to the housing of said motor, the improvement comprising clutch means connected to said cable at the end opposite said motor and means driven by said clutch for rotating a scrubbing pad; said clutch means comprising a tubular clutch housing having closed ends, one of said ends having a central circular opening of substantially the same diameter as said cable casing, said cable casing passing through said circular opening in said end, a disc having a greater outer diameter than said cable casing secured to said cable casing end and rotatably mounted in said clutch housing adjacent said end so that the said cable casing is retained in said clutch housing and said clutch housing is rotatable about said cable casing, a driving clutch jaw rotatably mounted in said clutch housing, said jaw being fixed to said cable core for rotation therewith, a clutch shaft rotatably and slidably supported in said clutch housing and extending through the end thereof opposite said cable connection, a driven clutch jaw mounted on said clutch shaft, means on said shaft external to said clutch housing for retaining a scrubbing pad, and means normally urging said driven clutch jaw into engagement with said driving clutch jaw.

3. A device as claimed in claim 2, characterized in that said clutch is provided with means for manually urging said driven clutch jaw out of engagement with said driving clutch jaw.

4. A pad scrubbing device as claimed in claim 2, characterized in that said means for urging said driven jaw into engagement with said driving jaw comprises a collar on said clutch shaft and a spring bearing against the end of said clutch housing and against said collar.

5. A device as claimed in claim 3, characterized in that said means for manually urging said driven jaw out of engagement with said driving jaw comprises a collar on said clutch shaft, a fork extending perpendicular to said shaft and bearing against said collar, said fork having an extension lying parallel to said clutch housing, a slot in said housing, and an operating button mounted on said extension outside said housing and adapted to be manually operated to disengage said driven clutch jaw from said driving clutch jaw.

References Cited in the file of this patent

UNITED STATES PATENTS

| | | |
|---|---|---|
| 184,992 | Starr | Dec. 5, 1876 |
| 1,563,707 | Hohl | Dec. 1, 1925 |
| 1,620,591 | Braly | Mar. 8, 1927 |
| 1,800,072 | Hight | Apr. 7, 1931 |
| 1,891,470 | Errington | Dec. 20, 1932 |
| 2,008,894 | Bergstrom | July 23, 1935 |

FOREIGN PATENTS

| | | |
|---|---|---|
| 175,241 | Great Britain | Oct. 18, 1921 |